US006600910B1

(12) United States Patent
Danet et al.

(10) Patent No.: US 6,600,910 B1
(45) Date of Patent: Jul. 29, 2003

(54) RADIO FREQUENCY TRANSFORMER AND ITS USE

(75) Inventors: Olivier Danet, Osny (FR); Cyril Didier, Chilly Mazarin (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/498,747

(22) Filed: Feb. 7, 2000

(30) Foreign Application Priority Data

Mar. 11, 1999 (FR) .......................................... 99 02994

(51) Int. Cl.[7] .............................................. H04B 1/18

(52) U.S. Cl. ...................... 455/292; 333/177; 336/145; 336/232

(58) Field of Search ............................... 455/292, 280, 455/95, 403; 336/800, 145, 146, 147, 148, 173, 184, 238, 223; 333/119, 177, 35

(56) References Cited

U.S. PATENT DOCUMENTS

| | | | | |
|---|---|---|---|---|
| 5,184,103 A | * | 2/1993 | Gadreau et al. | 336/84 C |
| 5,373,112 A | * | 12/1994 | Kamimura et al. | 174/255 |
| 5,386,206 A | * | 1/1995 | Iwatani et al. | 336/200 |
| 5,806,159 A | * | 9/1998 | Ohnishi et al. | 29/25.35 |
| 5,834,992 A | * | 11/1998 | Kato et al. | 333/185 |
| 6,285,273 B1 | * | 9/2001 | Morikawa | 336/200 |

FOREIGN PATENT DOCUMENTS

| | | |
|---|---|---|
| EP | 0 853 377 A2 | 7/1998 |
| EP | 0 866 513 A2 | 9/1998 |
| GB | 2 311 417 A | 9/1997 |
| JP | 59 223 004 A | 12/1984 |
| JP | 09 260 146 A | 10/1997 |

* cited by examiner

*Primary Examiner*—William Trost
*Assistant Examiner*—Cong Van Tran
(74) *Attorney, Agent, or Firm*—Sughrue Mion, PLLC

(57) ABSTRACT

A radio frequency transformer has the two lines which constitute it on at least four levels of a printed circuit. Two of the four levels correspond to each line. In one variant the lines are wrapped onto a cube. The levels corresponding to one line are interleaved with the levels corresponding to the other one. The transformer has two input ports, one of which is connected to ground, and two output ports. This reduces the area and therefore the cost of the circuit or provides the facility to mount other components and thus other functions.

9 Claims, 2 Drawing Sheets

RADIO FREQUENCY TRANSFORMER AND ITS USE

BACKGROUND OF THE INVENTION

1. Field of the Invention

The invention relates to a balanced-unbalanced radio frequency transformer (balun) and its use. Its field of application is that of processing radio frequency signals and more particularly that of mobile telephony. The object of the invention is to reduce the size of a transformer of this kind implemented in the form of lines printed on a main card in order to reduce the unit cost.

2. Description of the Prior Art

These transformers have fixed dimensions because of their nature. They are seen as reciprocal passive octopoles (four ports). Each port is connected to a respective output by a line. One port is connected to ground and a radio frequency signal of amplitude A is applied to a second port. Two output signals are obtained, each on one output, having an amplitude A/k and a relative phase of θ°. The factors k and θ are respectively determined by the distance between the lines constituting the transformer and by the length and the width of each line. Reciprocally, two signals of amplitude A/k and with a relative phase of θ° are applied at the output to recover a signal of amplitude 2A/k at the second port. The physical dimensions of the components constituting the transformer are imposed by the relative phase θ. A transformer of this kind therefore has minimum overall dimensions.

At the present time radio frequency transformers include an insulative material substrate plate. Each of the lines constituting the transformer is placed on one face of the substrate plate. With the aim of economizing on area the lines follow parallel paths which are either a straight line or a loop. The lines are therefore on two levels, on respective opposite sides of the substrate. These transformers are also sometimes implemented in coaxial cable. The two coupled lines are then the core and the shield of the coaxial cable. The problem of area congestion is then associated with a problem of volume congestion.

A mobile telephone may require several radio frequency transformers. If they are implemented in coaxial cable, for example, they take up room in terms of thickness and area, which can be prejudicial to the design and to the cost of the mobile telephone. If other solutions are adopted the thickness problems can be solved but the area used by the transformers cannot be used for other functions and the size of the mobile telephone will be increased.

The invention solves the above problem by providing a radio frequency transformer implemented on at least four levels. The four levels are layers of metallization of a multilayer printed circuit, for example. In one example the printed circuit has six layers. Implementing the transformer on four levels is not a problem with regard to the printed circuits used, since most mobile telephones already use printed circuits with six-level technologies. The area congestion of the transformer of the invention on printed circuits is then greatly reduced. Using the inner layers of a multilayer circuit frees up the surface on which surface-mount components can be mounted.

SUMMARY OF THE INVENTION

The invention therefore provides a radio frequency transformer including two main lines which have parallel routes and which lie on at least four different levels materialized by four parallel planes, two of which levels correspond to a first of the two main lines and two other of which levels correspond to the second of the two main lines, and four ports consisting of the ends of the main lines.

The invention also encompasses the use of a transformer of the above kind in a mobile telephone modulator or demodulator.

The invention will be understood better after reading the following description and examining the accompanying drawings. The drawings are provided by way of non-limiting example of the invention.

DETAILED DESCRIPTION OF THE PREFERRED EMBODIMENTS

Figure 1:
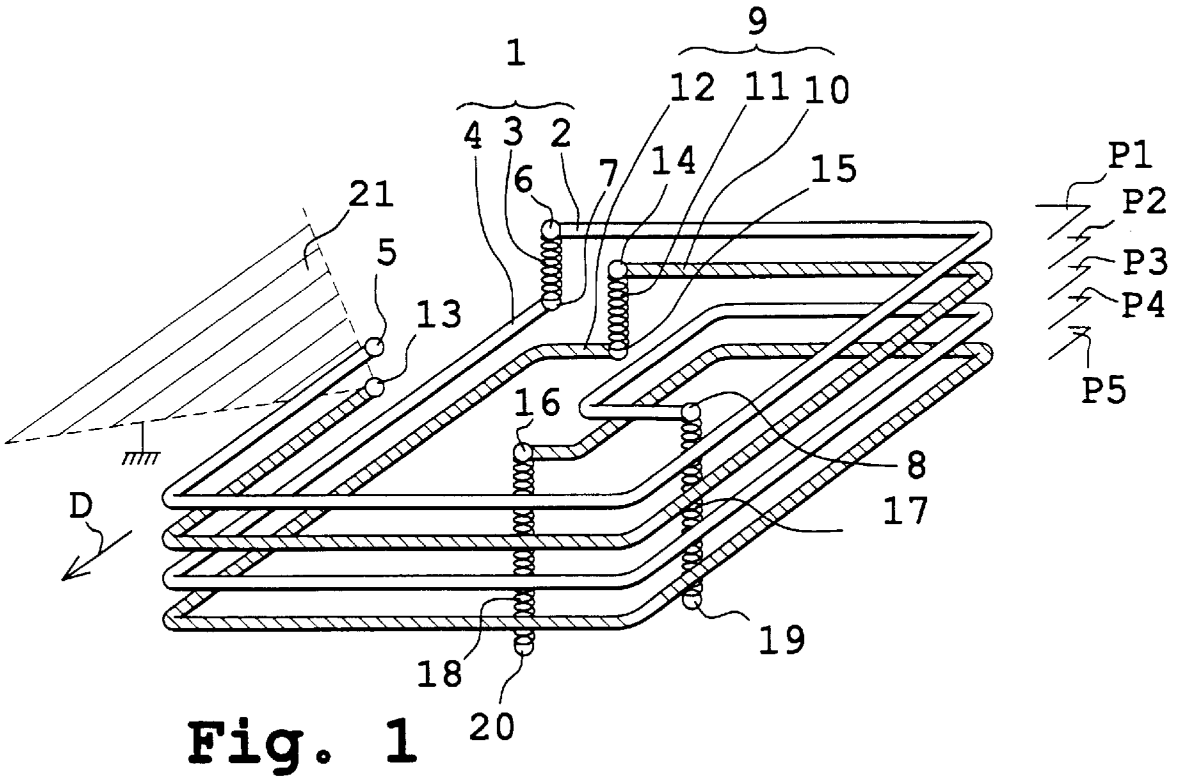
FIG. 1 shows a transformer in accordance with the invention.

FIG. 1 shows a transformer in accordance with the invention. The transformer includes a first main line 1 made up of two line sections 2 and 4 interconnected by a plated-through hole 3. The hole 3 is represented as a coil because of its inductive effect. The other holes are also subject to this inductive effect. The line section 2 has an origin 5 and an end of line 6. The line section 4 has an origin 7 and an end of line 8. The hole 3 connects the respective ends 6 and 7 of the sections 2 and 4. The origin 5 of the line section 2 is regarded as the origin of the line 1. The end 8 of the line section 4 is considered as the output port of the line 1. FIG. 1 also shows a line 9 including elements numbered 10 through 16 similar to the elements of the line 1 respectively numbered 2 through 8.

A preferred embodiment of the transformer includes a wrapping of lines on a cylinder. In accordance with the invention, one turn of this wrapping is on one level. The transition to another turn is effected by a change of level along the cylinder. The turns of the two cylindrical lines of the transformer are interleaved. The transition from one level to another for one line is effected at a location other than the transition from one level to another for another line. Thus the lines are never short-circuited.

In one example of the invention a relative phase of 180° is required between the output ports 8 and 16. Theory indicates that each line must have a length of λ/4 where λ is the wavelength in the dielectric corresponding to the frequency at which the radio frequency transformer is required to operate. In this example the cylinder has a square cross section. From its origin 5, the line 1 extends a distance λ/4/15 in a direction D. The line 1 then turns 90° counterclockwise and extends a distance λ/4/7.5. It again turns 90° counterclockwise and again extends a distance λ/4/7.5. These four extensions run from the end 5 to the end 6 on one level. The expression "extension of L" refers to the line turning through an angle of 90° in the counterclockwise direction and then extending a distance L. The line effects an extension of λ/4/7.5 to reach the end 6 of the line section.

The ends 6 and 7 are vertically aligned and connected by the hole 3. From the end 7 the line 1 extends in the direction D on a second level a distance λ/4/7.5. It then effects two extensions of λ/4/7.5 followed by two extensions of λ/4/15. The line 1 therefore extends a total distance of λ/4 on two levels.

The origin 13 of the line 9 is on a third level and vertically below the origin 5 of the line 1. From its origin 13 the line 9 extends a distance λ/4/15 in a direction D. It then effects two extensions of λ/4/7.5. It then reaches the end 14 via an extension of slightly less than λ/4/7.5. This is because the line 9 must not impinge on the hole 3 which is part of the line 1, as this would cause a short circuit. The end 15 is on a fourth level and, in this example, vertically below the end 14. From the end 15 the line 9 extends in a straight line to a point vertically in line with the ends 6 and 7 of the line 1. From here, the line 9 extends a distance λ/4/7.5 in the direction D. It then effects two extensions of λ/4/7.5 followed by two extensions of λ/4/15. The line 9 also has a length of λ/4 and also lies on two levels.

The ends 8 and 16 of the lines 1 and 9 must be slightly offset from each other. They are close together compared to the distance λ/4. This is because they are inside loops traced out by the route of the lines 1 and 9. Signals can be recovered from these lines only by means of plated-through holes 17 and 18 at the ends 8 and 16. The ends 8 and 16 must not be vertically in line with each other or with the line of which they are not part, because the holes 17 and 18 must not encounter any line on their route. The other ends of the holes 17 and 18 are ports 19 and 20 for recovering the signals at the ends 8 and 16, respectively. In this example, the line 1 lies in planes P1 and P3 and the line 9 in planes P2 and P4. The ports 19 and 20 are then preferably in a plane P5 below the planes P1 to P4.

In this example the planes are stacked up in the order P1, P2, P3, P4 and P5, from the highest to the lowest. In these planes the lines 1 and 9 wrap around a cube.

In a variant of the invention the lines could wrap around a circular cylinder or any other geometrical element of constant cross section with a vertical axis.

In another variant of the invention the ports 19 and 20 could be in any plane. For this it would be sufficient for the last extension of the lines 1 and 9 to be at an angle of 90° clockwise, rather than 90° counterclockwise. This would enable the ports 19 and 20 to be placed in any other plane, from plane P1 through P5, but would increase the area required for the radio frequency transformer.

FIG. 1 also shows a triangular ground plane 21 in the plane P2. One end of the ground plane 21 is connected to the input port 13 of the line 9. Because of its large area, the plane 21 extends the ground to the port 13, limiting interference effects.

The distance between the planes P1, P2, P3 and P4 is determined by the coupling factor k required and also varies as a function of the dielectric between the planes. As a general rule it is small compared to λ/4. The planes are preferably equidistant.

In practice a transformer in accordance with the invention can be mounted on a printed circuit as a discrete component. It is preferably formed directly in the printed circuit, however. The principle is the same in both cases. A multilayer circuit is used, i.e. a circuit which can be regarded as a stack of several plates of the same substrate or different substrates. Lines can be traced between each plate and the next. Thus with five stacked substrate plates a circuit with six layers is obtained. The various substrate plates can be pierced with holes and each hole can be metal-plated. It is therefore possible to incorporate a high-frequency transformer in accordance with the invention in a circuit of this kind. To make it into a discrete component all that is required is to cut out the circuit of interest and to place it in a package with leads connected to the four ports of the transformer by tracks. This enables the resulting component to be mounted on a circuit.

Figure 2:
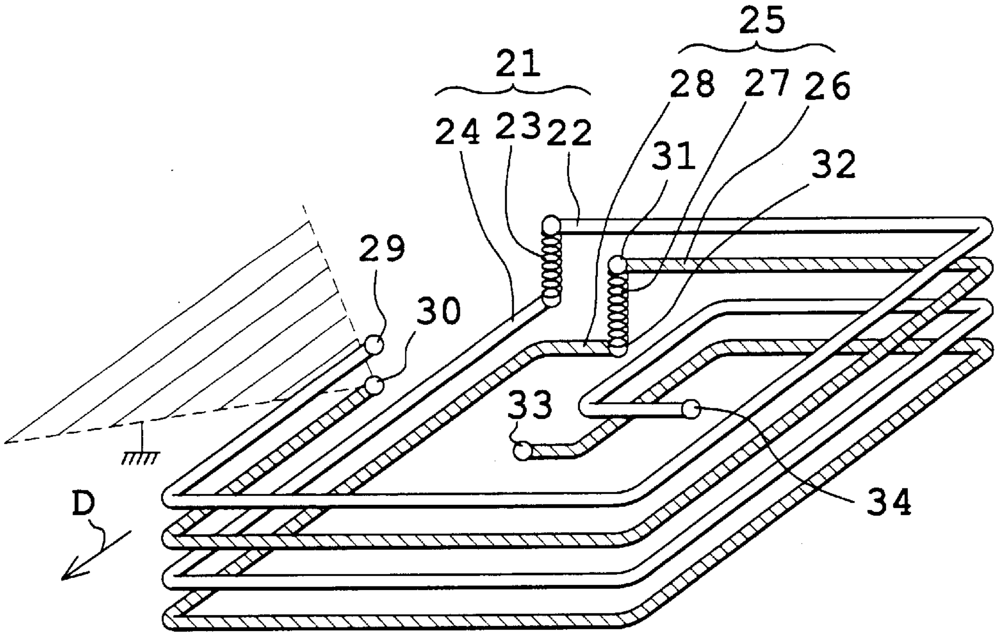
FIG. 2 shows a transformer in accordance with the invention in which all the plated-through holes are open at the ends.

The difficulty in the technology just described lies in making holes through only some plates of the substrate. The holes 3 and 11 in FIG. 1 are examples of holes which do not pass completely through the structure. The hole 3 is vertically in line with line section 12 and the hole 11 is vertically in line with line section 10. FIG. 2 shows how to make these holes open-ended holes, i.e. holes passing through all the substrate plates. 5

As an alternative to the above, the transitions from one turn to another are effected by choosing a cylinder for one line different to that chosen for another line. If required the two cylinders differ from each other only in a slight offset.

Thus FIG. 2 shows a line 21 including a line section 22, a hole 23 and a line section 24 similar to the line 1 shown in FIG. 1. FIG. 2 also shows a line 25 including a line section 26, a hole 27 and a line section 28. The line 21 has an origin 29 and the line 25 has an origin 30 vertically in line with the origin 29. The line 25 extends a distance λ/4/15 from its origin 30 in a direction D and then effects two extensions of λ/4/7.5 followed by an extension of slightly less than λ/4/7.5. At this point the line 25 is offset by a distance that is very small compared to λ/4/7.5 in order to move it away from the vertical line through the line section 22 at the end 31 of the section 26 of the line 25. One end 32 of the line section 28 is vertically in line with the end 31. From the end 32, the line 25 extends in a direction perpendicular to the line section 24 in contact with the hole 23 of the line 21 until it is vertically in line therewith. The line 25 then extends a distance slightly less than λ/4/7.5 in a direction D and then effects two extensions of λ/4/7.5 and then two extensions of λ/4/15 to reach an end 33 of the line 25. The line 21 has an end 34. The signals are recovered at the ports 33 and 34 in exactly the same way as described with reference to FIG. 1 for the ports 8 and 16. The manner in which the hole 27 is offset from the line 21 means that the holes 23 and 27 can be open-ended holes, which represents a saving in the final cost of a circuit containing one or more transformers in accordance with the invention.

Figure 3:
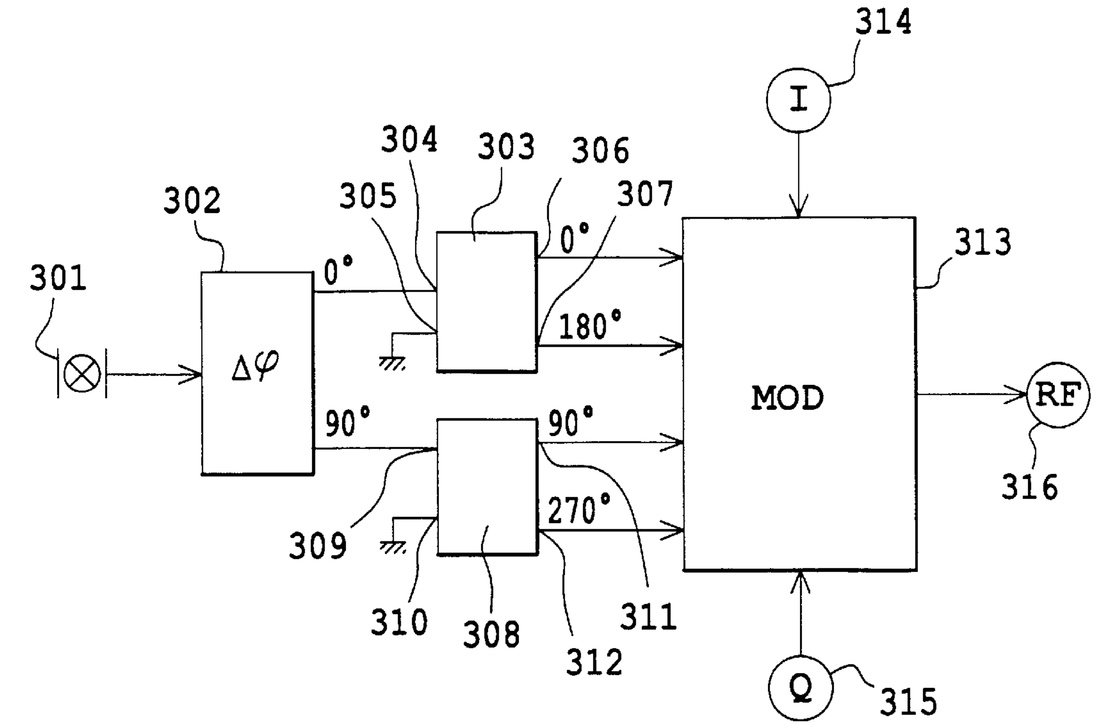
FIG. 3 shows one example of the use of a radio frequency transformer in accordance with the invention in a mobile telephone modulator.

FIG. 3 shows one example of the use of transformers in accordance with the invention. FIG. 3 shows a local oscillator 301 connected to a phase-shifter 302. The phase-shifter 302 provides at its output two signals corresponding to the signal from the local oscillator but with a relative phase of 90°. One output of the phase-shifter 302 is connected to an input 304 of the first transformer 303 in accordance with the invention. A second input 305 of the transformer 303 is connected to ground. The transformer 303 provides at an output 306 a signal corresponding to that from the oscillator 301 and at an output 307 a signal corresponding to that from the oscillator 301 but with a relative phase of 180°. A second output of the phase-shifter 302 provides a signal corresponding to that from the oscillator 301 with a relative phase of 90°. This output is connected to a first input 309 of a second transformer 308 in accordance with the invention. The second input 310 of the transformer 308 is connected to ground. The first output 311 of the transformer 308 provides a signal corresponding to that from the oscillator 301 with a relative phase of 90°. A second output 312 of the transformer 308 provides a signal corresponding to that from the oscillator 301 with a relative phase of 270°. The outputs 306, 307, 311 and 312 are connected to a modulator 313. The modulator 313 also receives an I signal 314 and a Q signal 315. The I and Q signals are obtained in a manner that is well known in the mobile telephone art. From all the signals applied to it the modulator 313 produces a radio frequency signal 316 in a manner well known in the art. The radio frequency signal is then transmitted by the mobile telephone.

In the case of a particularly small mobile telephone, the use of the invention is more beneficial when two transformers are needed. Being able to incorporate them into a printed circuit of the mobile telephone helps to improve the compactness and reduce the size of the mobile telephone.

Figure 4:
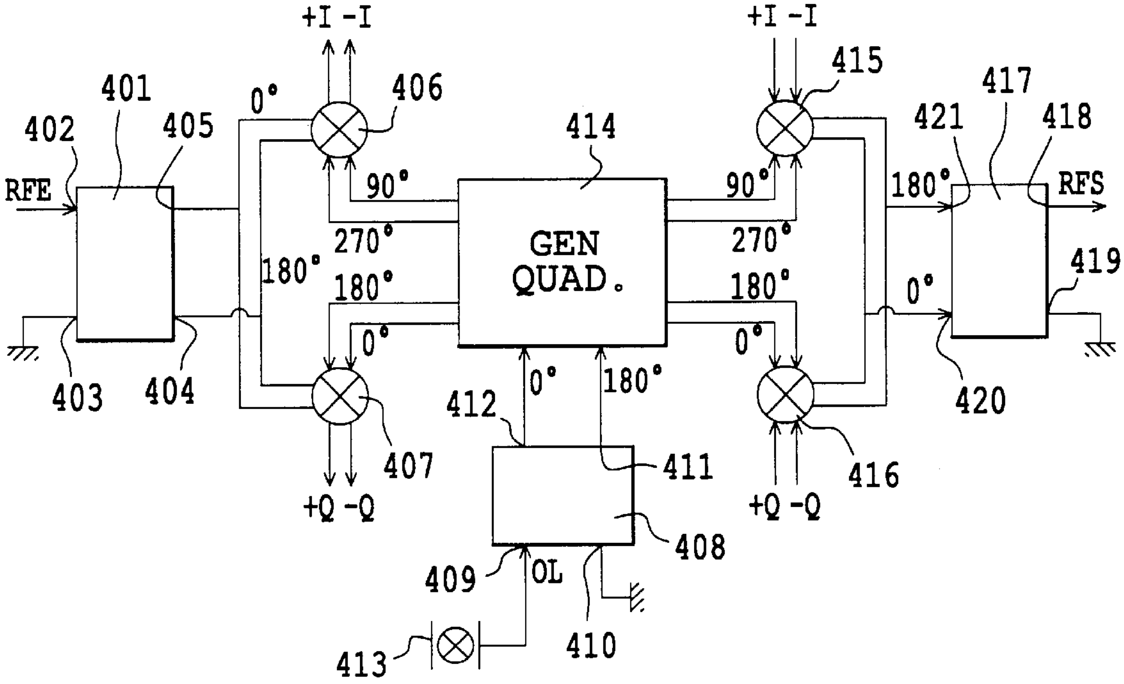
FIG. 4 shows one example of the use of a transformer in accordance with the invention in a modulator-demodulator.

FIG. 4 shows a first transformer 401 in accordance with the invention. A radio frequency input signal RFE is applied to a first port 402 of the transformer 401. A second port 403 is connected to ground. In this configuration an output 405 of the transformer 401 delivers a signal of amplitude A1 equal to half the amplitude of the input signal and in phase therewith. An output 404 of the transformer 401 delivers a signal of amplitude Al with a relative phase of 180° to the input signal. By analogy with FIG. 1 the ports 402 through 404 respectively correspond to the ports 5, 13, 20 and 19. The outputs 404 and 405 are simultaneously connected to mixers 406 and 407.

FIG. 4 also shows a second transformer 408 in accordance with the invention. A signal delivered by a local oscillator 413 is applied to a first port 409 of the transformer 408. A second port 410 of the transformer 408 is connected to ground. In this configuration an output 411 of the transformer 408 delivers a signal with a phase of 180° relative to the signal from the local oscillator 413 and of amplitude A2 equal to half the amplitude of the signal delivered by the oscillator 413. An output 412 of the transformer 408 delivers a signal of amplitude A2 in phase with the signal delivered by the oscillator 413. By analogy with FIG. 1 the ports 409 through 412 respectively correspond to the ports 5, 13, 20 and 18. The outputs 411 and 412 are connected to a quadratic generator 414.

The function of the generator 414 is to shift the phase of the signals applied to it 90°. The generator 414 delivers at separate ports respective signals S0, S90, S180 and S270 whose amplitude is a fraction or a multiple of the amplitude of the signal delivered by the oscillator 413 and having phases of 0°, 90°, 180° and 270° relative to the signal from the oscillator 413. The ports of the generator 414 delivering the signals S90 and S270 are connected to the mixer 406. The ports of the generator 414 delivering the signals S0 and S180 are connected to the mixer 407. The mixer 406 delivers signals +I and –I. The mixer 407 delivers signals +Q and –Q. These signals are demodulated signals available for subsequent processing, for example in a mobile telephone.

The signals S90 and S270 delivered by the generator 414 are also applied to inputs of a mixer 415. Other inputs of the mixer 415 receive the signals +I and –I obtained in a manner known in the art. The mixer 415 then delivers two radio frequency signals with a relative phase of 180°. One of the two signals is in phase with the signal delivered by the oscillator 413. That signal is applied to a port 420 of a third transformer 417 in accordance with the invention. The other signal is applied to an input 421 of the transformer 417. The signals S0 and S180 delivered by the generator 414 are applied to inputs of the mixer 416. Other inputs of the mixer 416 receive the signals +Q and –Q obtained in a manner known in the art. The mixer 416 then delivers two radio frequency signals with a relative phase of 180°. One of the two signals is in phase with the signal delivered by the oscillator 413. That signal is applied to a port 420 of the transformer 417. The other signal is applied to an input 421 of the transformer 417.

An output 419 of the transformer 417 is connected to ground. By analogy with FIG. 1, the ports 418 through 421 respectively correspond to the ports 5, 13, 19 and 20. In this configuration the transformer 417 delivers a radio frequency signal RFS at an output 418.

A device like that shown in FIG. 4 can be used in a mobile telephone, for example.

What is claimed is:

1. A radio frequency transformer comprising:

two separate main lines which have parallel routes and which lie on at least four different levels materialized by four parallel planes, wherein a first of said two main lines is disposed on a first and a third plane of said four parallel planes and a second of said two main lines is disposed on a second and a fourth plane of said four parallel planes, and four ports comprising ends of said main lines.

2. The transformer of claim 1, wherein said main lines are the same length λ/4 where λ is the wavelength in the dielectric corresponding to a frequency at which said transformer is to operate.

3. The transformer of claim 1, wherein each line has an origin materialized by one of its ports and the origins are close together compared to λ/4.

4. The transformer of claim 1, wherein said lines are wrapped onto a cube.

5. The transformer of claim 1, further comprising:

a multilayer printed circuit having at least four parallel planes and wherein said four parallel planes of said transformer are said four layers of said multilayer circuit.

6. The transformer of claim 5, wherein at least one main line further comprises inter-layer plated-through holes.

7. The transformer of claim 6, wherein all said inter-layer plated-through holes are open-ended holes, wherein one main line being slightly offset relative to the other main line.

8. The transformer of claim 1, wherein one origin port is connected to ground by a triangular ground plane, one apex of which is connected to said origin port.

9. The transformer of claim 1, wherein said transformer is implemented in a mobile telephone modulator or demodulator.

* * * * *